United States Patent [19]

Nakayama

[11] Patent Number: 5,286,184
[45] Date of Patent: Feb. 15, 1994

[54] INJECTION MOLDING APPARATUS HAVING TWO HOT RUNNER BLOCKS FOR PRODUCING A COMPOSITE ARTICLE

[75] Inventor: Toshio Nakayama, Hiroshima, Japan

[73] Assignee: The Japan Steel Works, Ltd., Tokyo, Japan

[21] Appl. No.: 865,443

[22] Filed: Apr. 9, 1992

[30] Foreign Application Priority Data

Apr. 15, 1991 [JP] Japan ................................ 3-109827

[51] Int. Cl.⁵ .................................................. B29C 45/16
[52] U.S. Cl. ................................... 425/130; 425/564; 425/566; 425/573
[58] Field of Search ............... 425/130, 562, 564, 566, 425/573

[56] References Cited

U.S. PATENT DOCUMENTS 4,717,324  1/1988  Schad et al. ..................... 425/130
5,167,896  12/1992  Hirota et al. ..................... 425/130

FOREIGN PATENT DOCUMENTS 161189  11/1985  Japan ................................ 425/130

*Primary Examiner*—Tim Heitbrink
*Attorney, Agent, or Firm*—Sughrue, Mion, Zinn, Macpeak & Seas

[57] ABSTRACT

In an injection molding machine, a skin layer resin 26 is injected from a first hot runner 10b into a cavity C in a mold or molds and then a resin passage between the first hot runner 10b and the cavity C is closed, thereby finishing the injection of the skin layer resin 26. A core layer resin 28 is injected from a second hot runner 12b into the cavity C in the mold(s) at a predetermined timing during the period between the start and end of injection of the skin layer resin 26, thereby molding a sandwich molded product without hesitation marks.

4 Claims, 2 Drawing Sheets

INJECTION MOLDING APPARATUS HAVING TWO HOT RUNNER BLOCKS FOR PRODUCING A COMPOSITE ARTICLE

BACKGROUND OF THE INVENTION

1. Field of the Invention

This invention relates to an injection molding method using an injection mold having a gate, and also to an injection mold for use therewith.

2. Description of the Related Art

FIG. 4 shows a conventional injection molding machine. In such an injection molding machine, two injection devices 50 and 52 are provided upstream of an injection nozzle 56, and a rotary valve 54 is provided in a resin passage between the injection nozzle 56 and the injection devices 50 and 52. The injection nozzle 56 is pressed against a mold 58. By switching the angular position of the rotary valve 54 so as to select one of the two injection devices 50 and 52, proper injection can be effected. For example, a skin layer resin material is first injected from the injection device 50 into a cavity C, and then the rotary valve 54 is switched, and a core layer resin material is injected from the injection device 52 into the cavity C. By doing so, a so-called sandwich molded product 64 having a core layer 62 covered with a skin layer 60 can be produced. FIG. 4 shows the condition of injecting of the core layer resin material from the injection device 52.

However, this type of machine has disadvantages. In particular, it is difficult to mold a sandwich molded product having a smooth surface. This is so because, during the time when the injection is switched from the skin layer resin injecting condition to the core layer resin injecting condition, there is a time period during which no resin is injected into the cavity C. Because of this temporary stoppage in the flow of the molten resin, a so-called hesitation mark is formed on the surface of the sandwich molded product. This detracts from the appearance of the final product. The above machine also has a disadvantage in that it is difficult to effect a multi-shot molding.

SUMMARY OF THE INVENTION

An object of the present invention is to solve these problems. According to the present invention, there is provided an injection molding method including the steps of injecting a skin layer resin from a first hot runner into a cavity of a mold, subsequently interrupting a resin passage between the first hot runner and the cavity so as to complete the injection of the skin layer resin, and injecting a core layer resin from a second hot runner into the cavity at a predetermined time period between the start and end of the injection of the skin layer resin. A machine for performing the above method has a fixed mold, a movable mold, a first hot runner block, and a second hot runner block mounted in the fixed mold. A piston is also provided and a valve member is connected to the piston.

A cavity is defined by the movable mold and the fixed mold. The first hot runner block has a first sprue, a first hot runner communicated with said first sprue, and a seat portion. The second hot runner block has a second sprue, and a second hot runner communicated with the second sprue. A cylinder chamber is formed in the fixed mold and the piston is fitted in the cylinder chamber. The valve member extends through the second hot runner block and fits in the first hot runner block. The valve member is movable between a first hot runner-closing position where its distal end is pressed against a seat portion and a first hot runner-opening position where the distal end is spaced apart from the seat portion.

A resin passage is formed in the valve member. One end of the resin passage is communicated with the second hot runner whereas the other end thereof is communicated with the cavity. When the distal end of the valve member is held apart from the seat portion, the first hot runner is communicated with the cavity. On the other hand, when the distal end is pressed against the seat portion, the communication between the first hot runner and the cavity is interrupted.

The valve member for making and interrupting the communication between the first hot runner and the cavity of the mold is first placed in the first hot runner-opening position, and in this condition the skin layer resin is injected into the cavity through the first hot runner. Then, the valve member is brought into the first hot runner-closing position so as to interrupt the communication between the first hot runner and the cavity. The core layer resin is then injected into the cavity via the second hot runner of the second hot runner block and the resin passage of the valve member at a predetermined timing during the period from the start of the injection of the skin layer resin to the interruption of the resin passage. As a result, there is produced the sandwich molded product having the skin layer resin covering the outer periphery of the core layer resin. In the present invention, there is no stoppage of the resin flow during the period between the end of the injection of the skin layer resin and the start of the injection of the core layer resin and, therefore, the resulting sandwich molded product does not have hesitation marks.

DETAILED DESCRIPTION OF THE PREFERRED EMBODIMENT

Figure 1:
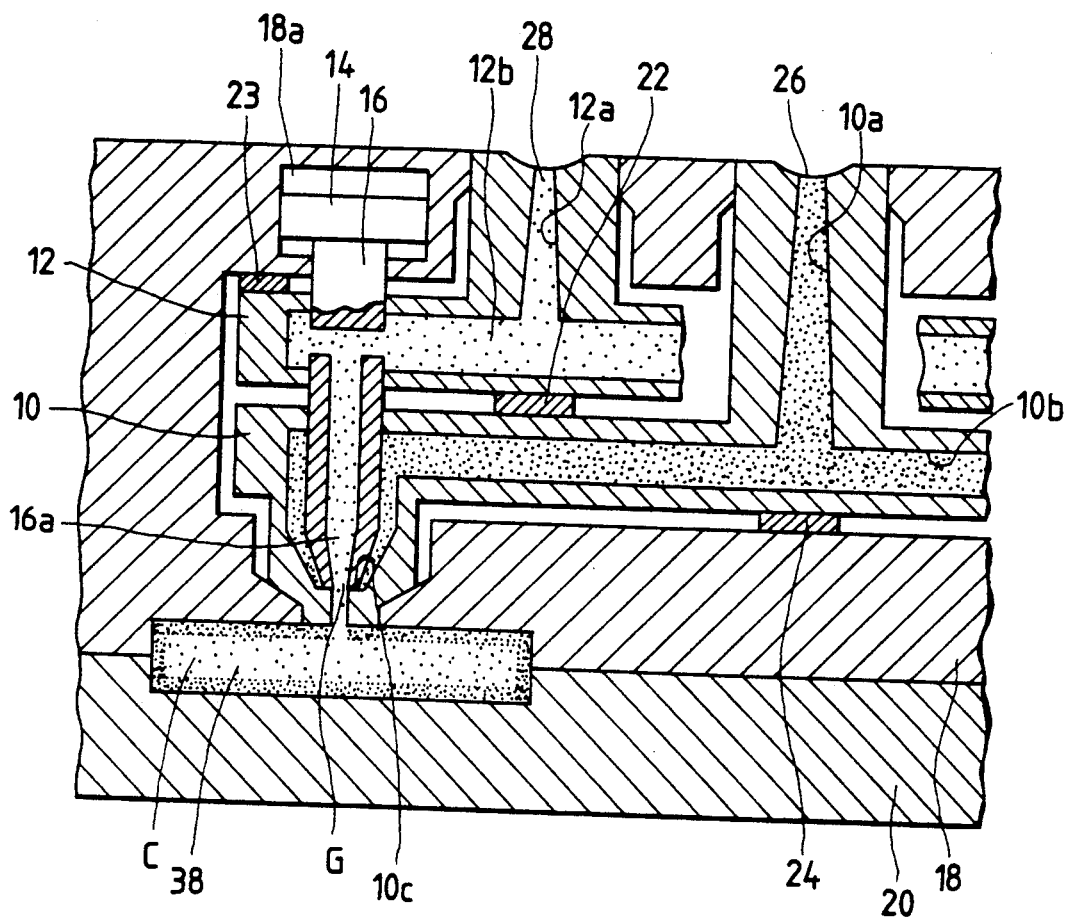
FIG. 1 is a cross-sectional view of a portion of a first embodiment of a mold of the present invention.

FIG. 1 shows a first preferred embodiment of the present invention. A fixed mold 18 and a movable mold 20 are placed in contact with each other at a mold parting surface so as to define a cavity C. A cylinder chamber 18a is formed in the fixed mold 18. A first hot runner block 10 and a second hot runner block 12 are fitted in the fixed mold 18. The first hot runner block 10 and second hot runner block 12 are spaced a predetermined distance from each other by a heat-insulating member 22 in overlapping relation to each other. The first hot runner block 10 has a first sprue 10a, a first hot runner 10b, a seat portion 10c, and a gate G. The second hot runner block 12 has a second sprue 12a and a second hot runner 12b. A piston 14 is mounted within the cylinder chamber 18a of the fixed mold 18. A valve member 16 connected to this piston extends through the second hot runner block 12 and fits in the first hot runner block 10. A resin passage 16a is formed in the valve member 16. One end of the resin passage 16a communicates with the second hot runner 12b and the other end thereof communicates with the gate G.

When the distal end of the valve member 16 is pressed against the seat portion 10c of the first hot runner block 10 as shown in the drawings, that is, the valve member is disposed in a first hot runner-closing position, the communication between the first hot runner 10b and the cavity C is interrupted. When the valve member 16 is spaced apart from the seat position, the first hot runner 10b communicates with the cavity C. Regardless of the position of the valve member 16, the second sprue 12a always communicates with the cavity C via the second hot runner 12b and the resin passage 16a. A heat-insulating member 24 is provided between the fixed mold 18 and the first hot runner block 10, and a heat-insulating member 23 is provided between the fixed mold 18 and the second hot runner block 12. The heat-insulating members 22, 23, and 24 prevent heat transfer between the first and second hot runner blocks 10 and 12, between the fixed mold 18 and the first hot runner block 10, and between the fixed mold 18 and the second hot runner block 12, respectively.

The operation of the first embodiment will now be described. The two molds 18 and 20 are closed and clamped together by a mold clamping device (not shown). Air pressure is supplied to a lower chamber (in the drawings) of the cylinder chamber 18a of the fixed mold 18 so as to move the valve member 16 to the first hot runner-opening position which is somewhat above the illustrated position of the valve member. By doing so, the first hot runner 10b communicates with the cavity C. A skin layer resin 26 is then injected from the first sprue 10a. The skin layer resin 26 passes through the first sprue 10a, the first hot runner 10b, and the gate G, and flows into the cavity C.

When a predetermined amount of the skin layer resin 26 has been injected, air pressure is supplied to an upper chamber (in the drawings) of the cylinder chamber 18a so as to move the valve member 16 to the first hot runner-closing position, which is shown in the drawings. By doing so, the injection of the skin layer resin 26 is terminated. Slightly before, or simultaneously with, the end of the injection of the skin layer resin 26, a core layer resin 28 is injected from the second sprue 12a. The core layer resin 28 passes through the second sprue 12a, the second hot runner 12b, and the gate G, and finally flows into the cavity C. After a predetermined amount of the core layer resin 28 has been injected, the process is finished. Accordingly, a sandwich molded product 38 having the skin layer resin 26 covering the outer surface of the core layer resin 28 can be produced. In the method of the present invention, since the core layer resin 28 can be injected successively after the injection of the skin layer resin 26, the resin flow never stops, and therefore hesitation marks will not develop on the surface of the sandwich molded product 38.

Figure 2:
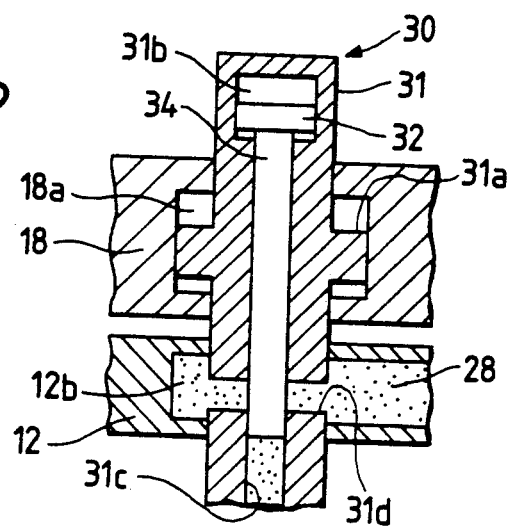
FIG. 2 is a cross-sectional view of a portion of a second embodiment of a mold of the invention.

FIG. 2 shows a second preferred embodiment of the present invention. The second embodiment differs from the first embodiment in that a valve opening/closing device 30 is mounted in a cylinder chamber 18a of a fixed mold 18. A piston cylinder 31 has a flange 31a, a piston chamber 31b, a first resin passage 31c, and a second resin passage 31d. The outer periphery of the flange 31a fits in the cylinder chamber 18a. A piston 32 fits in the piston chamber 31b. A valve member 34 is connected to the piston 32. The valve member 34 fits in the first resin passage 31c of the piston cylinder 31. The second resin passage 31d extends through the piston cylinder 31 perpendicularly to the axis of this piston cylinder 31. The valve member 34, when disposed in its lowered position shown in the drawings, interrupts the communication between a second hot runner 12b and the passage 31c. When air pressure is supplied to a lower chamber (in the drawings) of the piston chamber 31b, the valve member 34 is moved to a raised position above the illustrated position of the valve member so as to allow communication between hot runner 12b and the passage 31c.

The operation of the second embodiment will now be described. The valve member 34 is disposed at the second hot runner-opening position which is above the illustrated position of the valve member to inject a core layer resin 28 into a cavity C (not shown). Subsequently, the valve member 34 is moved to the second hot runner-closing position shown in the drawings to thereby finish the injection of the core layer resin 28. Other operations are similar to that of the first embodiment.

Figure 3:
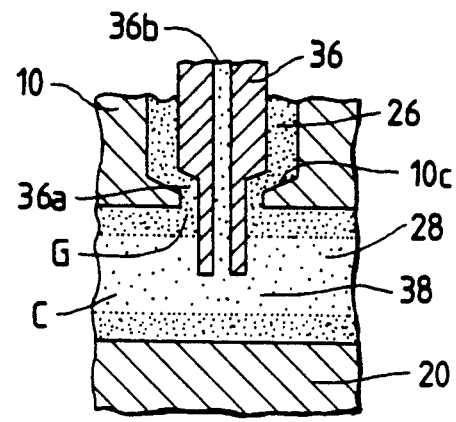
FIG. 3 is a cross-sectional view of a portion of a third embodiment of a mold of the invention.
Figure 4:
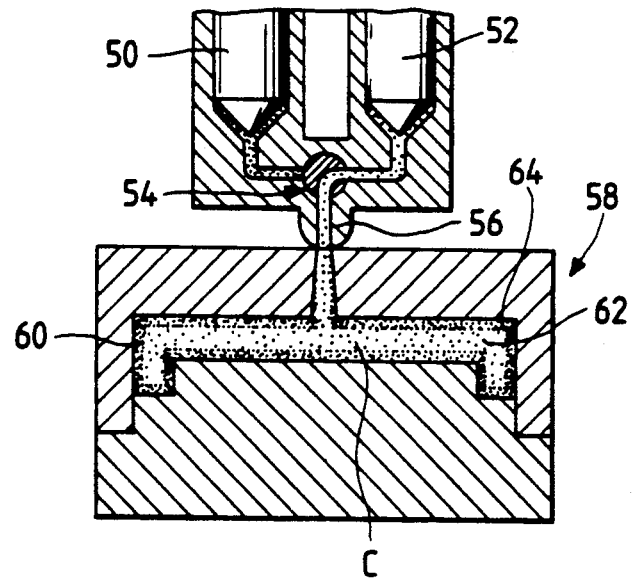
FIG. 4 is a view showing a conventional injection molding machine.

FIG. 3 shows a third preferred embodiment of the present invention. A stepped portion 36a is formed on an outer periphery of a valve member 36. The end portion of the valve member 36 extends through a gate G into a cavity C.

The operation of the third embodiment will now be described. A skin layer resin 26 is injected into the cavity C as shown in the drawings, and then the stepped portion 36a of the valve member 36 is pressed against a seat 10c to thereby finish the injection of the skin layer resin 26 into the cavity C. A core layer resin 28 is injected from a resin passage 36b of the valve member 36 slightly before, or simultaneously with, this pressing operation. By doing so, sandwich molded product 38 can be produced without hesitation marks on its surface. In this third embodiment, the core layer resin 28 can be positively injected into the inside of the skin layer resin 26 and, therefore, a phenomenon (called a burst-through phenomenon), wherein the core layer resin 28 breaks through the skin layer resin 26 to the outer surface, is prevented.

In the above description, although the injection of the core layer resin 28 is started simultaneously with, or slightly before the end of, the injection of the skin layer resin 26, the injection of the core layer resin 28 may be started at a desired time during the period from the start and end of the injection of the skin layer resin 26.

Also, in the above description, the skin layer resin 26 and the core layer resin 28 are injected into one cavity C. However, more than one cavity C may be formed with respect to one mold so that a plurality of molded products can be molded.

Although the above-described embodiments are independent of one another, the second embodiment and the third embodiment can be utilized in combination. In this case, the core layer resin 28 is positively injected into the inside of the skin layer resin 26, and after a predetermined amount of the core layer resin 28 is thus injected, the communication between the second hot runner 12b and the gate G is interrupted to finish the injection.

As described above, in the present invention, a sandwich mold product can be molded without hesitation marks. Moreover, a plurality of molded products can be molded at the same time.

While the present invention has been described in conjunction with preferred embodiments thereof, it is apparent that modifications can be made without departing from the scope of the invention as defined by the appended claims.

What is claimed is:

1. An injection molding apparatus comprising:
   a fixed mold (18) having a first hot runner block (10) and a second hot runner block (12) mounted therein, said fixed mold having a cylinder chamber (18a) formed therein;
   a movable mold (20), said movable mold (20) and said fixed mold (18) defining a cavity therein;
   said first hot runner block (10) having a first sprue (10a), a first hot runner (10b) communicated with said first sprue, and a seat portion (10c), said second hot runner block (12) having a second sprue (12a), and a second hot runner (12b) communicated with said second sprue;
   a piston (14) fitted in said cylinder chamber which is formed in said fixed mold (18);
   a valve member (16) connected to said piston (14) and extending through said second hot runner block (12), and fitted in said first hot runner block (10); and
   said valve member (16) being movable between a hot runner-closing position where its distal end is pressed against said seat portion (10c) and a hot runner-opening position where said distal end is spaced apart from said seat portion;
   said valve member (16) having a resin passage (16a) formed therein, one end of said resin passage (16a) being in communication with said second hot runner (12b), and another end thereof being in communication with said cavity (C), whereby when said distal end of said valve member (16) is held apart from said seat portion (10c), said first hot runner (10b) is in communication with said cavity (C), and when said distal end is pressed against said seat portion (10c), communication between said first hot runner (10b) and said cavity (C) is interrupted.

2. An injection molding apparatus according to claim 1, in which the distal end portion of said valve member (16) is formed into a narrow stepped configuration, said distal end portion extending into said cavity (C).

3. An injection molding apparatus comprising:
   a fixed mold (18) having a first hot runner block (10) and a second hot runner block (12) mounted therein;
   a movable mold (20);
   a valve operating device (30);
   said movable mold (20) and said fixed mold (18) defining a cavity therein;
   said first hot runner block (10) having a first sprue (10a), a first hot runner (10b) communicated with said first sprue, and a seat portion (10c);
   said second hot runner block (12) having a second sprue (12a), and a second hot runner (12b) communicated with said second sprue;
   said fixed mold having a cylinder chamber (18a) formed therein;
   said valve operating device (30) including a piston cylinder (31) having a flange (31a) around its outer periphery and a piston chamber (31b) defined therein, a piston (32), slidably fitted in said piston chamber (31b), and a valve member (34) connected to said piston;
   said piston cylinder (31) having a first resin passage (31c) extending in its axial direction, and a second resin passage (31d) extending through said piston cylinder in a direction perpendicular to said first resin passage, said valve member (34) being movably fitted in said first resin passage (31c) so as to enable and disable communication between said first resin passage (31c) and said second resin passage (31d);
   said piston cylinder (31) extending through said second hot runner block (12), and fitting in said first hot runner block (10), and said piston cylinder (31) being movable between a first position where its distal end is pressed against said seat portion (10c) and a second position where said distal end is spaced apart from said seat portion, said flange (31a) being fitted in said cylinder chamber (18a) of said fixed mold (18);
   said first hot runner (10b) being in communication with said cavity (C), when said distal end of said cylinder piston (31) is held apart from said seat portion (10c), and communication between said first hot runner (10b) and said cavity (C) being interrupted when said distal end is pressed against said seat portion (10c).

4. An injection molding apparatus according to claim 3, in which the distal end portion of said piston cylinder (31) is formed into a narrow stepped configuration, said distal end portion extending into the cavity (C).

* * * * *